Jan. 1, 1935. A. J. MEYER 1,985,943
ENGINE
Filed Oct. 12, 1931
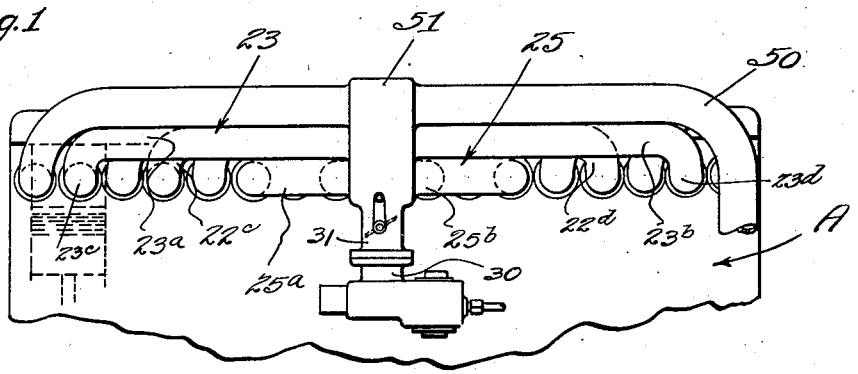
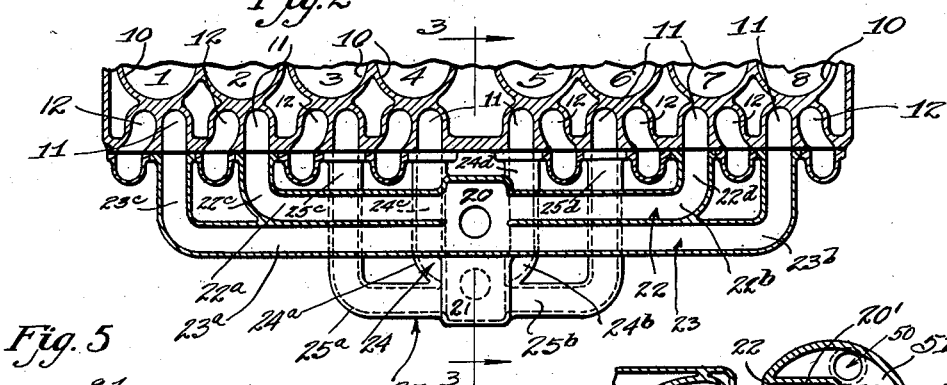
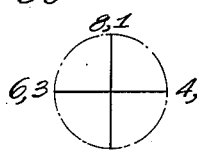
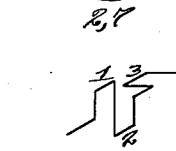
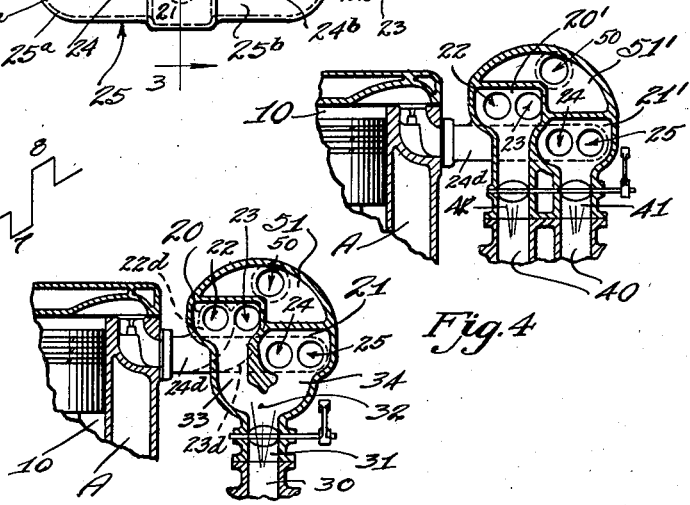
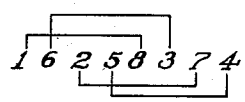
INVENTOR.
Andre J. Meyer
BY
ATTORNEY.

Patented Jan. 1, 1935

1,985,943

UNITED STATES PATENT OFFICE 1,985,943

ENGINE

Andre J. Meyer, Detroit, Mich., assignor to Continental Motors Corporation, Detroit, Mich., a corporation of Virginia Application October 12, 1931, Serial No. 568,217

26 Claims. (Cl. 123—52)

My invention relates to engines and more particularly to an intake manifold structure therefor.

An object of my invention is to provide a fuel mixture supply structure for an engine whereby substantially uniform distribution may be obtained of the fuel mixture to the various engine cylinders.

A further object of my invention is to provide an intake manifold structure for a multi-cylinder engine of the eight cylinders-in-line type providing for improved engine performance by constructing a manifold structure with branches cooperating with the engine crankshaft and various engine cylinders and so constructed that the intake period of all cylinders connected with the same branch are spaced apart by 360° of the crankshaft rotation.

For a more detailed understanding of my invention reference may be had to the accompanying drawing illustrating preferred embodiments of my invention and in which:

Fig. 1 is a side elevation of an engine having assembled therewith a fuel mixture supply manifold constructed in accordance with my invention, Fig. 2 is a horizontal fragmentary plan sectional view through the manifold structure as illustrated in Fig. 1, Fig. 3 is a transverse sectional view thereof taken substantially on the line 3—3 of Fig. 2, Fig. 4 is a similar transverse sectional view illustrating a modified form of construction, Fig. 5 is a diagrammatic view illustrating the crankshaft throw diagram, Fig. 6 is a diagrammatic perspective illustration of the crankshaft, and Fig. 7 is a diagrammatic showing of the firing order and the spacing of the cyclical events of the engine.

A designates an engine having a plurality of cylinders 10 and intake and exhaust ports 11 and 12 respectively. For purposes of illustration I have chosen to show my invention as incorporated with an engine having eight cylinders in line respectively numbered as shown in Fig. 2 from 1 to 8 inclusive. It is in an engine of this type that my improvements have particular significance. Obviously the broader aspects of my invention need not be limited to an engine of the type herein illustrated in which I have preferably provided a crankshaft of the 2—4—2 type which, as illustrated in Fig. 6, shows cranks 1 and 2 in a vertical plane parallel with the plane containing cranks 7 and 8 while cranks 3, 4, 5 and 6 are contained in a horizontal plane at right angles to the plane containing the remaining cranks.

It will be noted by observing Figs. 5 to 7 inclusive that the cyclical events of the engine controlled by the crankshaft as herein illustrated are spaced apart 360° of the crankshaft rotation. Obviously other types of crankshaft may be employed and I do not specifically limit my invention to a crankshaft as herein illustrated, as I have merely chosen to illustrate a crankshaft of this type since my invention is particularly adapted for use with a 2—4—2 crankshaft which can be very readily balanced.

The intake manifold structure includes separate fuel mixture distributing chambers 20 and 21 respectively arranged in such a manner as to be adapted for communication with a pair of fuel mixture conducting branches or lateral runners 22, 23 and the branches or lateral runners 24, 25. It will be noted that the engine cylinders are arranged in two groups, the inside group respectively consisting of cylinders 3, 4, 5 and 6 while the outside group of cylinders consists of cylinders 1, 2, 7 and 8. The branches of the intake manifold structure cooperate with the engine cylinders and crankshaft and are so constructed and arranged that the intake period of all cylinders connected to the same branch are spaced apart by 360° of the crankshaft rotation. Thus, cylinders 1 and 8 are connected by lateral runner or branch 23, said branch consisting of branch portions 23$^a$ and 23$^b$ respectively connecting the cylinders 1 and 8 and communicating with the fuel mixture distributing chamber 20, said branch portions preferably extending in opposite directions with respect to the chamber 20. Likewise cylinders 2 and 7 are connected by the branch or lateral runner 22 and cylinders 3, 6 and 4, 5 are respectively connected by branches or lateral runners 25 and 24. The branches 22, 24 and 25 are respectively constructed of branch or lateral runner portions 22$^a$, 22$^b$ and 24$^a$, 24$^b$ and 25$^a$ and 25$^b$. Thus it will be seen that each branch portion connects the fuel mixture distributing chamber associated therewith to one of the engine cylinders. These manifold branches extend longitudinally of the engine for the most part and are arranged substantially parallel to each other. More particularly the main body of the branch portions extend longitudinally of the engine but the port runner portions are positioned substantially at right angles thereto to conduct the fuel mixture to the intake ports respectively associated with the cylinders 1 to 8 inclusive.

It may be further noted that the distributing chamber 21 is located further from the central longitudinal plane of the engine than the chamber 20 and the branches 24, 25 communicating with the chamber 21 are thus arranged to cross-over the branches 22, 23 in a manner substantially as illustrated in Fig. 2.

In Fig. 3 I have illustrated my intake manifold structure assembled with a single tube carburetor, the carburetor tube being indicated by reference numeral 30. The carburetor is connected to the manifold riser 31, this manifold riser being branched as at 32 into secondary riser portions 33 and 34 which respectively communicate with the fuel mixture distributing chambers 20 and 21. It will be noted that chamber 20 is offset upwardly and to one side toward the engine with respect to the chamber 21, thereby bringing chamber 21 closer to the engine, more compactly nesting the parts, reducing branch wall surface area, and otherwise providing improved fuel mixture distributing characteristics. In Fig. 4 I have illustrated a dual carburetor having tubes 40 associated with separate riser portions 41 and 42 which conduct the fuel mixture respectively to the fuel mixture distributing chambers 20' and 21'. These chambers 20' and 21' are offset in a manner similar to that described for the chambers 20 and 21 and chambers 20' and 21' are also respectively adapted for connection with the branches 22, 23 and 24, 25 in substantially the same manner as illustrated in connection with Figs. 2 and 3.

In the illustrated form of my invention, each branch or lateral runner 22, 23, 24 and 25 communicates with a pair of engine cylinders by reason of pairs of port runners 22$^c$, 22$^d$; 23$^c$, 23$^d$; 24$^c$, 24$^d$; and 25$^c$, 25$^d$; these pairs of port runners in the order just set forth respectively forming extensions of the aforesaid branches or lateral runners. The lateral runners 22 and 23 are offset upwardly and to one side toward the engine with respect to the other lateral runners 24 and 25, runners 22 and 23 overlying the port runners 24$^c$, 24$^d$, 25$^c$ and 25$^d$ of the runners 24 and 25. Runners 22, 23 and runners 24, 25 are separated by partitions, extending longitudinally thereof and acting to divide the fuel mixture introduced thereto from the chambers 20 and 21 respectively. These partitions may be termed "splits".

If desirable the exhaust gases of the engine may be conducted through the exhaust manifold 50 and some of the exhaust gases may be conducted through the jacket portion 51 and 51' respectively associated with the constructions shown in Figs. 3 and 4. The particular means by which the exhaust gases are conducted in heat relation with the intake manifold structure forms no part of my present invention and the same may be constructed in any suitable manner to obtain the desired results.

It will thus be noted that I have provided an engine having generally improved operating characteristics because of the novel manifold structure assembled therewith which is so constructed and arranged in cooperation with the engine crankshaft and cylinders that the cyclical events of the engine, having all cylinders connected to the same branch, are spaced apart by 360° of the crankshaft rotation, thereby eliminating any overlapping of the cyclical events of any engine cylinder with respect to the cyclical event of another cylinder connected with the same fuel mixture conducting means or branches, and thus the surging of the fuel mixture in any of the branches caused by the intake of the fuel mixture into an engine cylinder does not effect the proper induction of fuel mixture to the other cylinder connected with the same branch.

It will be apparent to those skilled in the art to which my invention pertains that various modifications and changes may be made therein without departing from the spirit of my invention or from the scope of the appended claims.

What I claim as my invention is:

1. An intake manifold structure for an eight cylinder in line engine provided with a two-four-two crankshaft and including a plurality of fuel mixture conducting branches cooperating with the said crankshaft, said branches cooperating with the engine cylinders connected with the same branch and so constructed that the intake periods of all cylinders connected to the same branch are spaced 360 degrees of the crankshaft rotation.

2. An intake manifold structure for an engine having cylinders in line arranged with an inside group of four cylinders and an outside group of four cylinders, the latter group consisting of two pairs of cylinders located at opposite ends of the said inside group, said intake manifold structure including a fuel mixture distributing chamber and separate branch portions communicating with said chamber and individually connected with the cylinders of said inside group, and including a second fuel mixture distributing chamber and separate branch portions communicating with said second distributing chamber and individually connected with the cylinders of said outside group, and means for supplying fuel mixture to said fuel mixture distributing chambers.

3. An intake manifold structure for an engine having cylinders in line arranged with an inside group of four cylinders and an outside group of four cylinders, the latter group consisting of two pairs of cylinders located at opposite ends of the said inside group, said intake manifold structure including a fuel mixture distributing chamber and separate branch portions communicating with said chamber and individually connected with the cylinders of said inside group, and including a second fuel mixture distributing chamber and separate branch portions communicating with said second distributing chamber and individually connected with the cylinders of said outside group, and means for separately supplying fuel mixture to said fuel mixture distributing chambers.

4. An intake manifold structure for an engine having cylinders in line arranged with an inside group of four cylinders and an outside group of four cylinders, the latter group consisting of two pairs of cylinders located at opposite ends of the said inside group, said intake manifold structure including a fuel mixture distributing chamber and individual branch portions communicating with said chamber and arranged in oppositely extending pairs for forming separate conducting means individually connected with the cylinders of said inside group and including a second fuel mixture distributing chamber and individual branch portions communicating with said second chamber and arranged in oppositely extending pairs for forming separate conducting means individually connected with the cylinders of said outside group, and means for supplying fuel mixture to said fuel mixture distributing chambers.

5. An intake manifold structure for an engine having cylinders in line arranged with an inside group of four cylinders and an outside group of four cylinders, the latter group consisting of two pairs of cylinders located at opposite ends of the said inside group, said intake manifold structure including a fuel mixture distributing chamber and separate branch portions communicating with said chamber and individually connected with the cylinders of said inside group, and including a second fuel mixture distributing chamber and separate branch portions communicating with said second distributing chamber and individually connected with the cylinders of said outside group, the fuel mixture distributing chamber associated with the cylinders of said inside group being located more remote from the vertical longitudinal plane of the engine containing the cylinder axes than the chamber associated with the cylinder of said outside group.

6. In an engine having eight cylinders-in-line, a crankshaft, an intake manifold structure including a plurality of groups of manifold branches, each group communicating with a group of four of said cylinders and arranged in cooperation with the engine crankshaft for substantially 360° spacing in the firing order of any two successive cylinders of the same branch in any of said groups of manifold branches.

7. In an engine having eight cylinders-in-line, a crankshaft, an intake manifold structure including a plurality of manifold branches communicating respectively with groups of said cylinders and arranged in cooperation with the engine crankshaft for substantially 360° spacing in the firing of any two successive cylinders of the same branch.

8. In an engine having eight cylinders-in-line, a crank shaft, an intake manifold structure including a plurality of groups of manifold branches, each group communicating with a group of four of said cylinders and arranged in cooperation with the engine crankshaft for substantially 360° spacing in the firing order of any two successive cylinders of the same branch in any of said groups of manifold branches, the branches of one of said groups communicating with the first, second, seventh and eighth of said cylinders and the branches of the other of said groups communicating with the third, fourth, fifth and sixth of said cylinders.

9. In an engine having eight cylinders-in-line, a crankshaft, an intake manifold structure including a plurality of groups of manifold branches, each group communicating with a group of four of said cylinders and arranged in cooperation with the engine crankshaft for substantially 360° spacing in the firing order of any two successive cylinders of the same branch in any of said groups of manifold branches, said cylinders having a firing order of 1—6—2—5—8—3—7—4.

10. In an engine having eight cylinders-in-line, a crankshaft, an intake manifold structure including a plurality of manifold branches communicating respectively with groups of said cylinders and arranged in cooperation with the engine crankshaft for substantially 360° spacing in the firing of any two successive cylinders of the same branch, said cylinders having a firing order of 1—6—2—5—8—3—7—4.

11. In an engine having eight cylinders-in-line, a crankshaft, an intake manifold structure including a plurality of groups of manifold branches, each group communicating with a group of four of said cylinders and arranged in cooperation with the engine crankshaft for substantially 360° spacing in the firing order of any two successive cylinders of the same branch in any of said groups of manifold branches, said crankshaft being the 2—4—2 type.

12. In an engine having eight cylinders-in-line, a crankshaft, an intake manifold structure including a plurality of groups of manifold branches, each group communicating with a group of four of said cylinders and arranged in cooperation with the engine crankshaft for substantially 360° spacing in the firing order of any two successive cylinders of the same branch in any of said groups of manifold branches, said cylinders having a firing order of 1—6—2—5—8—3—7—4, said crankshaft being the 2—4—2 type.

13. Intake manifolding for an engine having eight longitudinally arranged cylinders, said manifolding having branches for respectively conducting fuel mixture to two groups of four cylinders each, one group comprising cylinders 1, 2, 7 and 8 and the other group comprising cylinders 3, 4, 5 and 6, a pair of fuel mixture distributing chambers respectively and separately opening to the said branches for said two groups, dividing means for said branches placing each cylinder in separate communication with one of said chambers, and means for supplying fuel mixture to said chambers.

14. Intake manifolding for an engine having eight longitudinally arranged cylinders, said manifolding having branches for respectively conducting fuel mixture to two groups of four cylinders each, one group comprising cylinders 1, 2, 7 and 8 and the other group comprising cylinders 3, 4, 5 and 6, a pair of fuel mixture distributing chambers respectively and separately opening to the said branches for said two groups, said branches having runner portions leading to individual cylinders of said engine whereby each cylinder of the engine is independently supplied with fuel mixture from one of said chambers, and means for supplying fuel mixture to said chambers.

15. Intake manifolding for an engine having eight longitudinally arranged cylinders, said manifolding having branches for respectively conducting fuel mixture to two groups of four cylinders each, one group comprising cylinders 1, 2, 7 and 8 and the other group comprising cylinders 3, 4, 5 and 6, a pair of fuel mixture distributing chambers respectively and separately opening to the said branches for said two groups, said branches having runner portions leading to individual cylinders of said engine whereby each cylinder of the engine is independently supplied with fuel mixture from one of said chambers, and means for supplying fuel mixture to said chambers, said chamber opening to said branches for said first group of cylinders being located between the other of said chambers and the engine.

16. Intake manifolding for an engine having eight longitudinally arranged cylinders, said manifolding having branches for respectively conducting fuel mixture to two groups of four cylinders each, a pair of fuel mixture distributing chambers, means for supplying fuel mixture to said chambers, and means for conducting fuel mixture from each of said chambers separately to the individual cylinders of each of said groups.

17. An intake manifold structure for engines and including a pair of lateral runners, one of said lateral runners offset upwardly and to one side of the other lateral runner, port runners connecting said lateral runners with the engine, a pair of fuel mixture conducting chambers respectively opening to said lateral runners, one of said chambers being offset upwardly and to one side of the other, said offset chamber being positioned intermediate the engine and the other chamber, and means for supplying fuel mixture to said chambers.

18. An intake manifold structure for engines and including a pair of lateral runners extending longitudinally of the engine, port runners communicating with said lateral runners, one of said lateral runners offset upwardly and to one side of the other lateral runner and arranged to overlie the port runners associated with said other lateral runner, a pair of fuel mixture conducting chambers respectively opening to said lateral runners, one of said chambers being offset upwardly and to one side of the other, said offset chamber being positioned intermediate the engine and the other chamber, and means for supplying fuel mixture to said chambers.

19. In a multi-cylinder engine having eight cylinders-in-line, a crankshaft, an intake manifold structure including a plurality of fuel mixture conducting branches co-operating with the engine cylinders and crankshaft so that the intake periods of all cylinders connected to the same branch are spaced apart by 360 degrees of the crankshaft rotation.

20. In a multi-cylinder engine having eight cylinders-in-line, a crankshaft, an intake manifold structure including a fuel mixture distributing chamber, fuel mixture conducting branches communicating therewith, said branches cooperating with the engine cylinders and crankshaft so that the intake periods of all cylinders connected to the same branch are spaced apart by 360 degrees of the crankshaft rotation.

21. In a multi-cylinder engine having eight cylinders-in-line, a crankshaft, an intake manifold structure including a fuel mixture distributing chamber, fuel mixture conducting branches including communicating branch portions terminating in outlets each connected with an engine cylinder, said branches cooperating with the engine cylinders and crankshaft so that the intake periods of all cylinders connected to the same branch are spaced apart by 360 degrees of the crankshaft rotation.

22. In a multi-cylinder engine having eight cylinders-in-line, a crankshaft, an intake manifold structure including a fuel mixture distributing chamber, fuel mixture conducting branches including substantially oppositely directed branch portions terminating in outlets each connected with an engine cylinder, said branches cooperating with the engine cylinders and crankshaft so that the intake periods of all cylinders connected to the same branch are spaced apart by 360 degrees of the crankshaft rotation.

23. In a multi-cylinder engine having more than seven cylinders-in-line, a crankshaft, an intake manifold structure including a plurality of fuel mixture conducting substantially parallel branches extending longitudinally of the engine, said branches cooperating with the engine cylinders and crankshaft so that the intake periods of all cylinders connected to the same branch are spaced apart by 360 degrees of the crankshaft rotation.

24. In an engine having at least eight cylinders, a crankshaft, an intake manifold structure including a plurality of groups of manifold branches, each group communicating with a pair of said cylinders and arranged in cooperation with the engine crankshaft for substantially 360° spacing in the firing of said two cylinders connected with the same branch.

25. In an engine having eight cylinders divided into two groups of four cylinders each, a crankshaft, a fluid distributing system for said engine including two intake manifold portions respectively cooperating with said two groups of cylinders, one of said intake manifold portions including a distributing chamber and oppositely extending manifold branches, a pair of port runners communicating with each of said branches, each of said port runners connecting the manifold branch with a single engine cylinder, the intake manifold portion aforesaid being constructed and arranged in cooperation with the engine crankshaft and engine cylinders so that the intake periods of the cylinders connected to the same branch are spaced apart by 360 degrees of the crankshaft rotation.

26. In an engine having eight cylinders divided into two groups of four cylinders each, a crankshaft, an intake manifold portion for one group of four cylinders and including a distributing chamber and a pair of manifold branches each connected with a pair of engine cylinders, said intake manifold portion being constructed and arranged in cooperation with the engine cylinders and engine crankshaft so that the intake periods of the cylinders connected to the same branch are spaced apart by 360 degrees of the crankshaft rotation.

ANDRE J. MEYER.